US012608185B2

(12) United States Patent
Trufas

(10) Patent No.: US 12,608,185 B2
(45) Date of Patent: Apr. 21, 2026

(54) SYSTEMS AND METHODS FOR CREATING AN EXTENDED SMART CARD APPLICATION FILE FROM MULTIPLE SMART CARD APPLICATION FILES

(71) Applicant: Oracle International Corporation, Redwood Shores, CA (US)

(72) Inventor: Marius Trufas, Bucharest (RO)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/064,826

(22) Filed: Dec. 12, 2022

(65) Prior Publication Data

US 2024/0192936 A1      Jun. 13, 2024

(51) Int. Cl.
G06F 8/41          (2018.01)
G06F 9/455          (2018.01)

(52) U.S. Cl.
CPC .......... G06F 8/447 (2013.01); G06F 9/45525 (2013.01)

(58) Field of Classification Search
CPC ............................ G06F 8/447; G06F 9/45525
USPC .......................................................... 717/148
See application file for complete search history.

(56) References Cited

U.S. PATENT DOCUMENTS 6,366,777 B1    4/2002  Uusitalo
6,510,516 B1 *  1/2003  Benson ................. G06F 21/565
                                                                            345/474

8,069,469 B1   11/2011  Atieh et al.
8,196,131 B1 *  6/2012  von Behren ........... G06Q 20/02
                                                                            705/64
9,189,634 B2   11/2015  Lin
9,426,543 B1 *  8/2016  Li ...................... H04N 21/8586
10,013,662 B2   7/2018  Brandwine et al.
10,084,604 B2   9/2018  Burghardt et al.
(Continued)

FOREIGN PATENT DOCUMENTS

CN        105404794 A      3/2016
EP          1830263 A2      9/2007
(Continued)

OTHER PUBLICATIONS

"Baseline Security Recommendations for IoT", Retrieved at https://www.enisa.europa.eu/publications/baseline-security-recommendations-for-iot, Nov. 20, 2017, 3 Pages.
(Continued)

*Primary Examiner* — Bradford F Wheaton
(74) *Attorney, Agent, or Firm* — Invoke

(57)          ABSTRACT

Techniques are described herein for merging multiple smart card application files into a single, consolidated file that may be used by a smart card runtime environment to execute multiple applications. The techniques may reduce the load size of installed application code on a smart card by bundling applications and libraries together into an optimized file. As a result, smart card platforms may have more space available to execute the applications at runtime and/or to install additional applications. Embodiments herein may further provide flexibility on defining access controls over resources for which the code is not known. When application files are merged, packages and libraries that were previously public may be made private within the merged application file to restrict external access to unknown code in the bundle.

20 Claims, 9 Drawing Sheets

(56) References Cited

U.S. PATENT DOCUMENTS

| | | | |
|---|---|---|---|
| 10,645,665 | B2 | 5/2020 | Shah |
| 11,115,284 | B1 | 9/2021 | Paiva et al. |
| 11,729,292 | B1* | 8/2023 | Hyndman ............. H04L 67/564 |
| | | | 709/219 |
| 2001/0047444 | A1 | 11/2001 | Waldie et al. |
| 2002/0093856 | A1 | 7/2002 | Baentsch et al. |
| 2004/0107222 | A1* | 6/2004 | Venkatesh ............... G06F 16/10 |
| 2004/0143820 | A1* | 7/2004 | Jong ................... G06F 9/44589 |
| | | | 717/126 |
| 2004/0193759 | A1* | 9/2004 | Scott ................. G06Q 20/3552 |
| | | | 710/36 |
| 2006/0004895 | A1* | 1/2006 | Kim ........................... G06F 8/65 |
| 2007/0169043 | A1* | 7/2007 | Violleau ................. G06F 9/526 |
| | | | 717/149 |
| 2008/0147508 | A1 | 6/2008 | Liu et al. |
| 2012/0108200 | A1 | 5/2012 | Rubin et al. |
| 2012/0108206 | A1 | 5/2012 | Haggerty |
| 2012/0190354 | A1 | 7/2012 | Merrien et al. |
| 2012/0327912 | A1 | 12/2012 | Kirveskoski |
| 2013/0024700 | A1* | 1/2013 | Peterson ............. G06F 16/1744 |
| | | | 713/189 |
| 2014/0073375 | A1 | 3/2014 | Li et al. |
| 2014/0188713 | A1 | 7/2014 | Alimi |
| 2014/0379987 | A1 | 12/2014 | Aggarwal et al. |
| 2015/0127529 | A1 | 5/2015 | Makhotin et al. |
| 2015/0134958 | A1 | 5/2015 | Merrien et al. |
| 2015/0288686 | A1 | 10/2015 | Pepin et al. |
| 2016/0014154 | A1 | 1/2016 | Huang et al. |
| 2018/0032734 | A1 | 2/2018 | Gunti et al. |
| 2018/0144137 | A1 | 5/2018 | Rhelimi et al. |
| 2019/0286577 | A1 | 9/2019 | Leitao et al. |
| 2020/0043123 | A1 | 2/2020 | Dash et al. |
| 2020/0201669 | A1 | 6/2020 | Hwang |
| 2020/0356468 | A1* | 11/2020 | Fugate ................ G06F 11/3688 |
| 2021/0243715 | A1 | 8/2021 | Matolia et al. |
| 2021/0318812 | A1 | 10/2021 | Lidman et al. |
| 2021/0350011 | A1 | 11/2021 | Ashlock et al. |
| 2022/0124481 | A1 | 4/2022 | Kang et al. |
| 2022/0191251 | A1* | 6/2022 | Gavish .................. H04L 63/101 |
| 2023/0047213 | A1 | 2/2023 | Chen et al. |
| 2023/0054424 | A1 | 2/2023 | Bamdhamravuri et al. |
| 2023/0217356 | A1 | 7/2023 | Cogan et al. |
| 2023/0308855 | A1 | 9/2023 | Matolia et al. |
| 2023/0308861 | A1 | 9/2023 | Fan et al. |

FOREIGN PATENT DOCUMENTS

| | | |
|---|---|---|
| EP | 3291084 A1 | 3/2018 |
| WO | 2018/042016 A1 | 3/2018 |

OTHER PUBLICATIONS

"MIPI I3C and I3C Basic", Retrieved at https://www.mipi.org/specifications/i3c-sensor-specification, Retrieved on May 2022, 8 Pages.

"NIST Releases Draft Guidance on Internet of Things Device Cybersecurity", Retrieved at https://www.nist.gov/news-events/news/2020/12/nist-releases-draft-guidance-internet-things-device-cybersecurity, Retrieved on May 2022, 3 Pages.

"Java Card™ Platform, Virtual Machine Specification, Classic Edition", Version 3.1, Feb. 2021, pp. 1-274.

Anonymous et al: "The CAP File Format", Retrieved from http://pfa12.free.fr/doc_java/javacard_specifications/specs/jcvm/html/JCVM06cap.html#53140, Retrieved on Apr. 25, 2024, pp. 1-41.

Tip et al., "Practical experience with an application extractor for Java", ACM SIGPLAN Notices, vol. 34, No. 10, 1999, pp. 292-305.

* cited by examiner

100

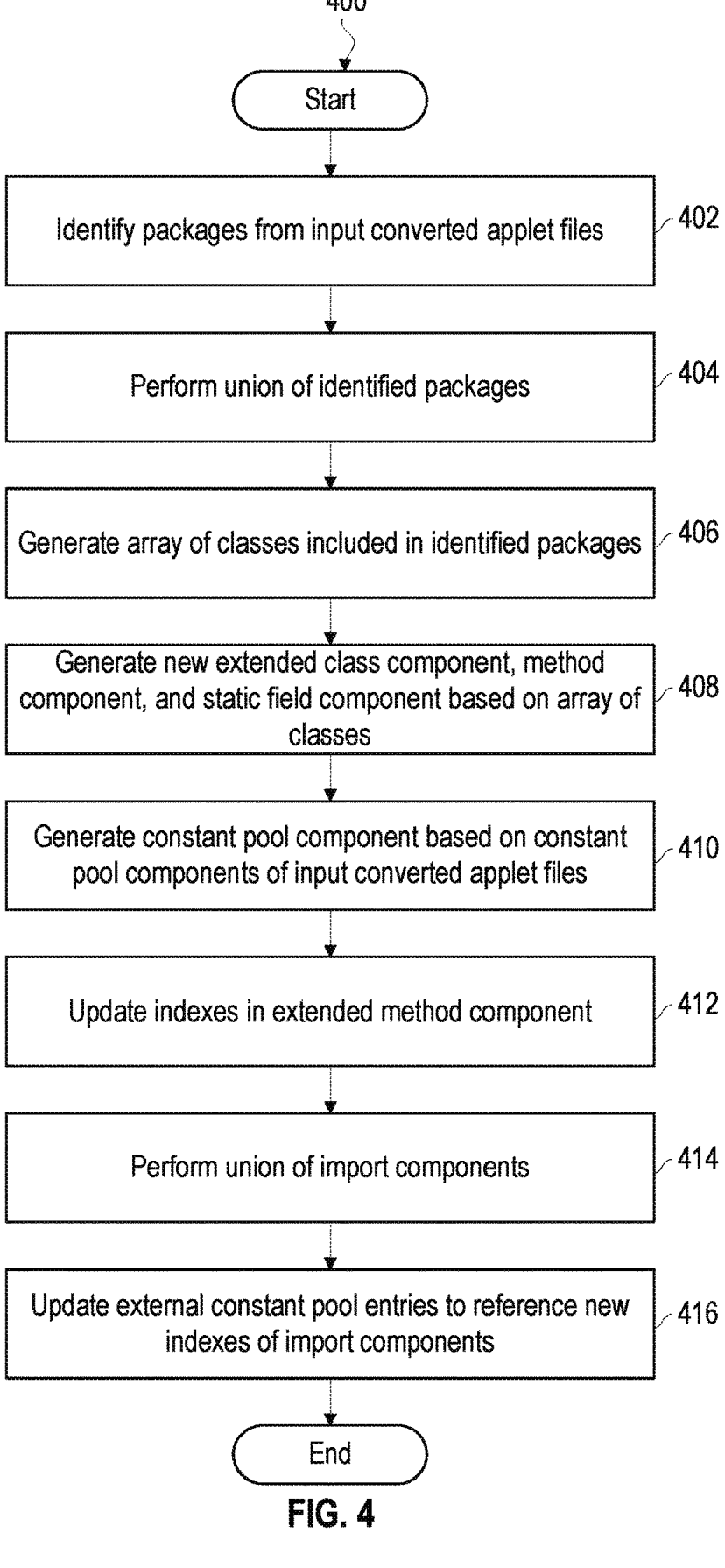

400

Start

Identify packages from input converted applet files | 402

Perform union of identified packages | 404

Generate array of classes included in identified packages | 406

Generate new extended class component, method component, and static field component based on array of classes | 408

Generate constant pool component based on constant pool components of input converted applet files | 410

Update indexes in extended method component | 412

Perform union of import components | 414

Update external constant pool entries to reference new indexes of import components | 416

End

FIG. 4

SYSTEMS AND METHODS FOR CREATING AN EXTENDED SMART CARD APPLICATION FILE FROM MULTIPLE SMART CARD APPLICATION FILES

TECHNICAL FIELD

The present disclosure relates, generally, to optimizing applets executing on secure element hardware. In particular, the present disclosure relates to techniques for merging applet files that run on smart cards and similar environments to reduce load size and improve processing speed.

BACKGROUND

Mobile phones and other devices often include secure elements, such as Subscriber Identity Module (SIM) cards and other forms of smart cards, to provide strong protection against unauthorized access of sensitive data. Smart cards may include a secure chip and dedicated software for executing a variety of applications including payment processing, biometric authentication, and mobile network communications. In many cases, both the chip and software of a smart card are packaged as a single product and distributed by a Security Service Provider (SSP).

Some platforms allow multiple applications to be loaded and installed on a single smart card to handle different application-specific functions. One challenge with installing multiple applications, however, is that smart card resources are generally much more limited than standard computing platforms. For example, smart cards often have limited persistent memory available to store application code and runtime created objects. As a result, smart cards often experience tight physical constraints on how much application code may be stored and executed.

Running multiple applications on a smart card may also give rise to security concerns. An application running on a smart card may benefit from accessing the application programming interface (API) of another application. However, when an API is exposed externally to other applications, other processes may potentially access the same API and gain unauthorized access to the smart card resources, presenting a security risk to data stored in secure memory.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates an example process for generating a set of components for an extended converted applet file based on multiple input converted applet files in accordance with some embodiments

DETAILED DESCRIPTION

Figure 1:
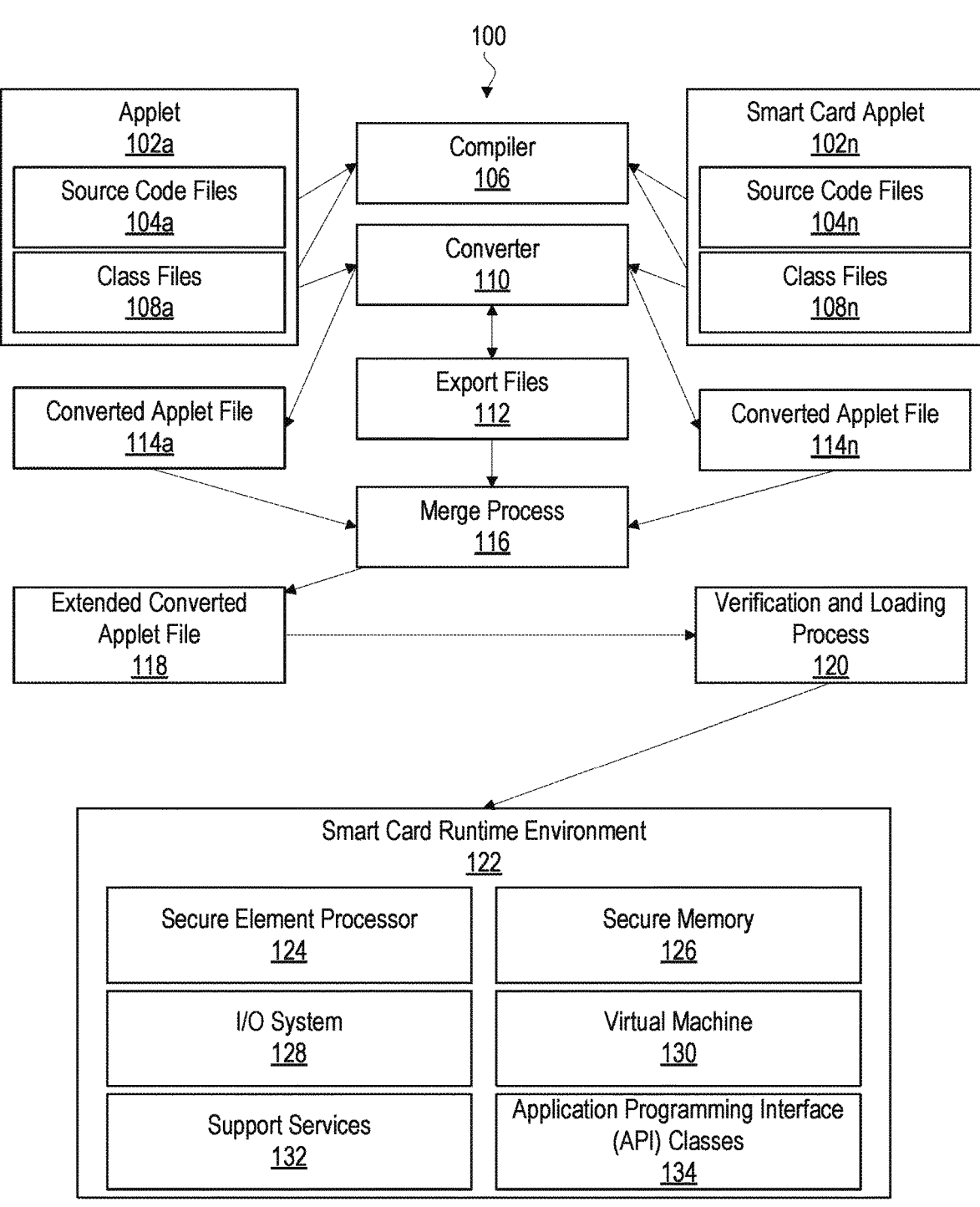
FIG. 1 illustrates an example system for loading and installing multiple applications on the same smart card in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention. One or more operations illustrated in the figures and described herein may be modified, rearranged, or omitted all together. Accordingly, the particular sequence of operations illustrated in the figures and examples should not be construed as limiting the scope of one or more embodiments.

1. General Overview

Techniques are described herein for merging multiple smart card application files into a single, consolidated file that may be used by a smart card runtime environment to execute multiple applications. The techniques may reduce the load size of installed application code on a smart card by bundling applications and libraries together into a single application file. As a result, smart card platforms may have more space available to execute the applications at runtime and/or to install additional applications.

The techniques may further improve the security and management of application code. Embodiments herein provide flexibility on defining access controls over third-party library implementations for which the code is not known. In particular, developers and smart card manufacturers may not inherently trust libraries that come from third parties and are public in terms of exported application programming interfaces (APIs). With a bundled application file, these libraries may be made private to prevent access to the code from external sources. Additionally or alternatively, the handling of naming, versioning, and code verification may be performed on the bundled application file rather than independently for each separate application binary, thereby streamlining these processes.

Embodiments herein include systems and methods for processing requests to bundle application binary files together. For example, a security service provider (SSP) or other user may submit a request to install multiple applications on the same smart card. In some cases, the user may not have access to the source code or the classes for one or more of the bundled applications, such as when the requested bundle includes applications developed by third parties. The system may merge the application binary files for each application to create an optimized application binary file for the bundle. The optimized binary file may be loaded onto a smart card platform and executed by the runtime environment to run the set of applications in the bundle.

One or more embodiments described in this Specification and/or recited in the claims may not be included in this General Overview section.

2. System Architecture

FIG. 1 illustrates an example system for loading and installing multiple applications on the same smart card in accordance with some embodiments. As illustrated in FIG. 1, system 100 includes applets 102*a-n*, compiler 106, converter 110, export files 112, converted applet (CAP) files 114*a-n*, merge process 116, extended CAP file 118, verification and loading process 120, and smart card runtime environment 122. In some embodiments, system 100 may include more or fewer components than the components illustrated in FIG. 1. The components illustrated in FIG. 1 may be local to or remote from each other. Each component may be distributed over multiple applications and/or machines. Multiple components may be combined into one application and/or machine. Operations described with respect to one component may instead be performed by another component.

Applets 102*a-n* correspond to a set of n applications that may be run on smart cards or similar environments. Different applets may perform different application-specific functions, which may leverage the resources of a smart card to perform specific tasks. For example, a payment processing applet may use a near field communication (NFC) interface of a smart card to establish a short-range wireless connection with a payment terminal and manage secure transactions. The same smart card may run applets to perform other tasks such as biometric authentication, identity management, and mobile network communications. The application-specific functions may vary from one bundle of applets to the next.

In some embodiments, source code files 104*a-n* contains source code that specifies the application-specific function of applets 102*a-n* using one or more programming languages, such as Java, C, C++, C#, Ruby, Perl, and so forth. Source code files 104*a-n* may adhere to a particular set of syntactic and/or semantic rules for the associated language. For example, code written in Java adheres to the Java Language Specification. However, since specifications are updated and revised over time, source code files 104*a-n* may be associated with version numbers indicating the revision of the specification to which a source code file adheres. The exact programming language used to write source code files 104*a-n* is generally not critical.

Compiler 106 compiles the source code into class files 108*a-n* representing the applet to be executed. Class files 108*a-n* may contain an intermediate representation ("virtual machine code/instructions"), such as bytecode, which is executable by a virtual machine. Additionally or alternatively, class files 108*a-n* may contain machine or object code, which is executable directly by a particular machine environment, such as a particular hardware processor.

In order to provide clear examples, source code files 104*a-n* have been illustrated as the "top level" representation of an applet to be executed by a smart card platform. In other embodiments, a source code file may be an intermediate representation received via a "higher level" compiler that processed code files in a different language into the language of the source code file. Some examples in the following disclosure assume that source code files 104*a-n* adhere to a class-based object-oriented programming language. However, this is not a requirement to utilizing the features described herein.

In some embodiments, compiler 106 receives, as input, a source code file (e.g., source code file 104*a*) and converts the source code file into a class file (e.g., class file 108*a*) that is in a format expected by a virtual machine. For example, in the context of a Java Virtual Machine (JVM), the Java Virtual Machine Specification defines a particular class file format to which class files are expected to adhere. Class files 108*a-n* may adhere to the JVM Specification. However, the format of the files may vary depending on the particular implementation.

Converter 110 converts the compiled class files 108*a-n* into converted applet (CAP) files 114*a-n*. In some embodiments, CAP files 114*a-n* contain binary representations that may be executed by a smart card platform to run an applet. For example, a Java Card CAP file may contain a binary representation for a package of classes that may be installed on a device and used to execute the packages of classes on a Java Card Virtual Machine (JCVM). The JCVM Specification is different than the JVM Specification as the JCVM is configured to run on smart cards and similar execution platforms with limited persistent memory and other resources. Some examples in the following disclosure assume that class files 108*a-n* adhere to the JVM Specification and CAP files 114*a-n* adhere to the JCVM Specification. However, this is not a requirement to utilizing the features described herein. In other embodiments, compiler 106 may directly compile source code files 104*a-n* into CAP files that may run on a smart card or similar execution platform.

In some embodiments, a CAP file includes a set of components that describe or otherwise define a package, such as a Java language package. A package may include a related set of classes, such as classes for a particular applet or that perform a specific set of tasks. The package may organize the classes into a namespace. Thus, different packages may allow distinct classes in the different namespaces to have identical names without colliding. Further, packages may provide access restrictions on classes to limit their visibility/use to within a particular class, library, or package, or to classes with appropriate permissions.

In some embodiments the CAP file components may describe a set of elements in a single package or in multiple packages. A CAP file that describes a single package is referred to herein as a compact CAP file, and a CAP file that describes multiple packages is referred to as an extended CAP file.

In some embodiments, a CAP file includes the following components:

A header component that contains general information about the package or set of packages included in the CAP file that are public;

A directory component listing the size of the other components defined in the CAP file;

An applet component that contains an entry for each applet defined in a package;

A class component that describes the classes and interfaces defined in a package;

A method component that describes each of the methods declared in the package;

A constant pool component that includes an entry for each of the classes, methods, and fields referenced by elements of the method component;

A static field component that includes information used to create and initialize an image of the static fields defined in a package;

A reference location component that references constant pool indices contained in the method component;

An import component that lists the set of packages imported by classes in a package;

An export component that lists the elements in a package that may be imported by classes in other packages; and A descriptor component that describes elements in the constant pool component, class component, method component, and static field component for use in verifying the CAP file. The descriptor component may further include indexes for packages that are private in the CAP file.

One or more of the components listed above may be omitted depending on the format of the CAP file. Additionally or alternatively, a CAP file may include other components that were not listed above.

Export files 112 contain the public API linking information of classes in a package. In some embodiments, export files 112 are not used directly on a device that implements a virtual machine running applets 102*a-n*. However, the information may be used by converter 110 to generate a CAP file. For example, converter 110 may generate an export file when a first package is converted to the CAP file format. If a second package imports classes from the first package, then converter 110 may use the export file to convert the second package. During the conversion process, converter 110 may load the export file of the different package and include information in the CAP file of the second package that is used by the execution platform to link the contents of the second package to items imported from the first package.

Merge process 116 receives, as input, multiple CAP files and merges the files to generate extended CAP file 118. Merge process 116 may consolidate the CAP file components and packages of the input CAP files, which may include compact and/or extended CAP files, into a single extended CAP file. Consolidating the components may significantly reduce the size of the applet code installed on smart card runtime environment 122. Stated another way, extended converted applet file 118 may be significantly smaller than the total size of the input converted applet files 114*a-n*.

Verification and loading process 120 may verify and install extended converted applet file 118 on smart card runtime environment 122. By merging converted applet files 114*a-n*, the verification and deployment of applets 102*a-n* may be performed on a single file rather than on multiple files, which may significantly speed up these processes. Although merge process 116 and verification and loading process 120 are illustrated as separate components, in some embodiments, the merging of CAP files may be performed as part of verification and loading process 120.

In some embodiments, the verification process performs an analysis of a package's export file and the export files of imported packages, if any. The verification process may determine whether a CAP file is internally consistent and adheres to a particular specification, such as the JCVM Specification. If the verification process determines that the CAP file is not consistent internally or in the context of the export files or otherwise fails to adhere to the specification for running on the smart card platform, then the verification process for the CAP file may fail. In this case, the CAP file is not deployed to the smart card. Otherwise, if the verification is successful, then the loading process may install extended CAP file 118 on the smart card platform, such as by downloading the file onto persistent memory of the device.

In the above example, the verification process is performed off-card before the CAP file is deployed. Additionally or alternatively, an on-card verification process may be implemented after extended CAP file 118 has been installed by smart card runtime environment 122. If verification fails, then smart card runtime environment 122 may prevent the applets from running on the smart card platform. Additionally or alternatively, the process of merging CAP files may be performed off-card or on-card, depending on the particular implementation.

Smart card runtime environment 122 includes resources for processing CAP files to run applets 102*a-n*. In some embodiments, smart card runtime environment 122 includes secure element (SE) processor 124, secure memory 126, input/output (I/O) system 128, virtual machine 130, software stack 132, and application programming interface (API) classes 134. Smart card runtime environment 122 may run on a smart cart or similar environment, such as a simulated smart card environment.

In some embodiments, smart card runtime environment 122 runs on a microprocessor-based chip that includes hardware components for protecting secure data from unauthorized access and running secure applications. For example, smart card runtime environment 122 may run on a universal integrated circuit card (UICC), which is a smart card that conforms to the specifications defined by the European Telecommunications Standards Institute ETSI Smart Card Platform project. A subscriber identification module (SIM) card is an example of a UICC. Additionally or alternatively, smart card runtime environment 122 may run on other types of integrated circuit cards (ICCs) and tamper-resistant security chips for controlling access to secure resources.

In some embodiments, smart card runtime environment 122 runs on a smart card deployed in a mobile device. For example, smart card runtime environment 122 may run on a SIM card installed on a mobile handset, such as a smartphone, configured to connect to one or more data communication networks, which may include wired and/or wireless data communication networks. Example data communication networks include Global Systems for Mobile (GSM), Code Division Multiple Access (CDMA), Universal Mobile Telecommunication System (UMTS), Long Term Evolution (LTE), General Packet Radio Service (GPRS), Universal Mobile Telecommunications System (UMTS), Broadband Global Area Network (BGAN), wireless local area network (WLAN), Ethernet, etc. Smart cards may be installed on other mobile devices, such as a tablet, laptop, or desktop computer, credit cards, and identity (ID) cards with an embedded secure element. In other cases, smart cards may be integrated into a complex system such as a connected automobile with an embedded secure element used for (a) connectivity, (b) vehicle-to-vehicle and/or vehicle-to-infrastructure monitoring, and/or (c) maintenance and/or service subscriptions.

In some embodiments, SE processor 124 is a microprocessor for executing an SE platform runtime environment and SE applications. An example SE platform runtime environment is Java Card Runtime Environment (JCRE). The JCRE provides a lightweight version of the Java Runtime Environment (JRE) that is tailored for smart cards and other tamper-resistant security chips to allow these SE hardware platforms to host SE applications employing Java technology. Although some examples described herein relate to the JCRE, embodiments described herein may be implemented by other runtime environments that execute on smart cards and other tamper-resistant chips.

In some embodiments, SE processor 124 includes a hardware-based cryptography module for encrypting and decrypting data stored within the smart card. The hardware-based cryptography module may be implemented as part of the instruction set of SE processor 124, allowing the processor to encrypt and decrypt data without relying on software algorithms to perform the encryption. In other embodiments, a hardware-based cryptography module may be external from the processor. For example, a co-processor or other hardware mechanism, such as an advanced encryption standard (AES) chip or cryptographic accelerator residing on a bus between SE processor 124 and SE memory 126, may encrypt data stored on the smart card.

Secure memory 126 securely stores data including CAP files and applet data. Secure memory 126 may include one or more types of volatile and/or non-volatile storage such as read-only memory (ROM), random-access memory (RAM), non-volatile memory (NVM), and one-time programmable (OTP) memory. Secure memory 126 may store the data in an encrypted format. As previously noted, the data may be encrypted by SE processor 124 and/or a hardware-based cryptography module according to one or more encryption schemes.

I/O system 128 includes interfaces and mechanisms for receiving and transmitting data by smart card runtime environment 122 to or from external components, which may include other components on the same device, such as a mobile processor of the device host on which the smart card is installed, or different devices, such as an external payment terminal or card reader.

In some embodiments, I/O system 128 includes components for wirelessly communicating with other devices. For example, I/O system 128 may include an NFC controller that receives near-field wireless messages from external devices. NFC communications may transmit data through inductive coupling between an antenna in an NFC controller and the external device when placed within a threshold distance. An NFC message may trigger an operation within smart card runtime environment 122 based on the applets that are installed and running thereon. For example, a payment terminal may generate an NFC message to extract credit card information and/or other data during a transaction. In response, an applet may perform one or more operations for processing secure transactions initiated with the payment terminal. NFC messages may trigger other operations, which may vary from applet to applet.

Additionally or alternatively, I/O system 128 may include other components for receiving messages through wired or wireless interfaces. For example, a device host on which the smart card is installed may include a Bluetooth module, a Zigbee chip, a Wi-Fi card, an infrared receiver, a universal serial bus (USB) controller, and/or a serial communications interface. Messages received through such hardware components may serve as external triggers that initiate operations from applets running within smart card runtime environment 122.

Virtual machine 130 manages secure memory 126 and provides a portable environment for running smart card applets. In some embodiments, virtual machine 130 interprets virtual machine instructions, such as bytecode, stored within extended CAP file 118 to run applets 102*a-n*. In the context of Java Card runtime environments, virtual machine 130 may conform to the JCVM Specification. The JCVM runs bytecode within CAP files, which is generated using a different encoding schema than used for the full Java Virtual Machine (JVM). For example, to optimize the execution of applications on a smart card, the applet's code may be divided into packages below a size threshold. The set of available packages and programming language constructs may also vary between the JCRE and JRE to optimize applet performance within smart card environments. However, as previously noted, the techniques may be applied to other environments that follows different specifications.

Support service 132 include a set of components that support the execution of applets 102*a-n* within smart card runtime environment 122. For example, support services 132 may include operating systems, firmware, and network services to provide various functions involved in running an applet on a smart card. The set of components may vary depending on the architecture of the smart card on which the applets are run.

In some embodiments, virtual machine 130 dynamically loads, links and initializes classes in extended CAP files 118 when running applets 102*a-n*. Loading is the process of finding a class within a particular name and creating a representation of the class within memory. For example, virtual machine 130 may create a runtime constant pool, method code, and field data for the class within a per-class memory area of secure memory 126. Linking is the process of taking the in-memory representation of the class and combining it with the runtime state of virtual machine 130 so that the methods of the class can be executed. Initialization is the process of executing the class constructors to (a) set the starting state of the field data of the class and/or (b) create class instances within memory.

The following are examples of loading, linking, and initializing techniques that may be implemented by virtual machine 130. However, in many embodiments, the steps may be interleaved, such that an initial class is loaded, then, during linking, a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To load a class, a class loader may parse the CAP file 118 to determine whether the CAP file is well-formed (meets the syntactic expectations of the virtual machine 130). If not, the class loader generates an error. For example, in a JCRE, the error might be generated in the form of an exception which is thrown to an exception handler for processing. Otherwise, the class loader may generate the in-memory representation of the class by allocating the run-time constant pool, method code, and field data for the class within the per-class arca.

In some embodiments, when the class loader loads a class, the class loader also recursively loads the super-classes of the loaded class. For example, virtual machine 130 may ensure that the super-classes of a particular class are loaded, linked, and/or initialized before proceeding with the loading, linking and initializing process for the particular class.

During linking, virtual machine 130 may verify the class, prepare the class, and perform resolution of the symbolic references defined in the run-time constant pool of the class. To verify the class, virtual machine 130 may check whether the in-memory representation of the class is structurally correct. For example, virtual machine 130 may check that each class except the generic class Object has a superclass, check that final classes have no sub-classes and final methods are not overridden, check whether constant pool entries are consistent with one another, check whether the current class has correct access permissions for classes/fields/structures referenced in the constant pool, check that the virtual machine code of methods will not cause unexpected behavior (e.g. making sure a jump instruction does not send virtual machine 130 beyond the end of the method), and so forth. The exact checks performed during verification are dependent on the implementation of the virtual machine In some cases, verification may cause additional classes to be loaded, but does not necessarily require those classes to also be linked before proceeding. For example, class A may contain a reference to a static field of class B. During verification, virtual machine 130 may check class B to ensure that the referenced static field actually exists, which might cause loading of class B, but not necessarily the linking or initializing of class B. However, in some embodiments, certain verification checks can be delayed until a later phase, such as being checked during resolution of the symbolic references. For example, some embodiments may delay checking the access permissions for symbolic references until those references are being resolved.

To prepare a class, virtual machine 130 may initialize static fields located within the field data for the class to default values. In some cases, setting the static fields to default values may not be the same as running a constructor for the class. For example, the verification process may zero out or set the static fields to values that the constructor would expect those fields to have during initialization.

During resolution, virtual machine 130 may dynamically determines concrete memory address from the symbolic references included in the run-time constant pool of the class. To resolve the symbolic references, virtual machine 130 may utilizes the class loader to load the class identified in the symbolic reference (if not already loaded). Once loaded, the virtual machine 130 may identify the memory location within the per-class area of the referenced class and its fields/methods. Virtual machine 130 may then replace the symbolic references with a reference to the concrete memory location of the referenced class, field, or method. In some embodiments, virtual machine 130 caches resolutions to be reused in case the same class/name/descriptor is encountered when the virtual machine 130 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, virtual machine 130 executes the constructor of the class to set the starting state of that class. For example, initialization may initialize the field and method data for the class and generate/initialize any class instances on the heap created by the constructor. For example, extended CAP files 118 may specify that a particular method is a constructor that is used for setting up the starting state. Thus, during initialization, virtual machine 130 may execute the instructions of that constructor.

In some embodiments, virtual machine 130 performs resolution on field and method references by initially checking whether the field/method is defined in the referenced class. Otherwise, the virtual machine 130 recursively searches through the super-classes of the referenced class for the referenced field/method until the field/method is located, or the top-level superclass is reached, in which case an error is generated.

3. Smart Card Applet Bundling

Developers, SSPs, mobile phone operators, manufactures, and/or other entities may wish to bundle applets together to install on smart card runtime environment 122. In some embodiments, system 100 may detect requests to bundle or install applets on the same smart card platform and transparently create an extended CAP file for the set of applets. In other cases, the user may have input into the creation of the extended CAP file, such as which packages, classes, and interfaces to make private.

Figure 2:
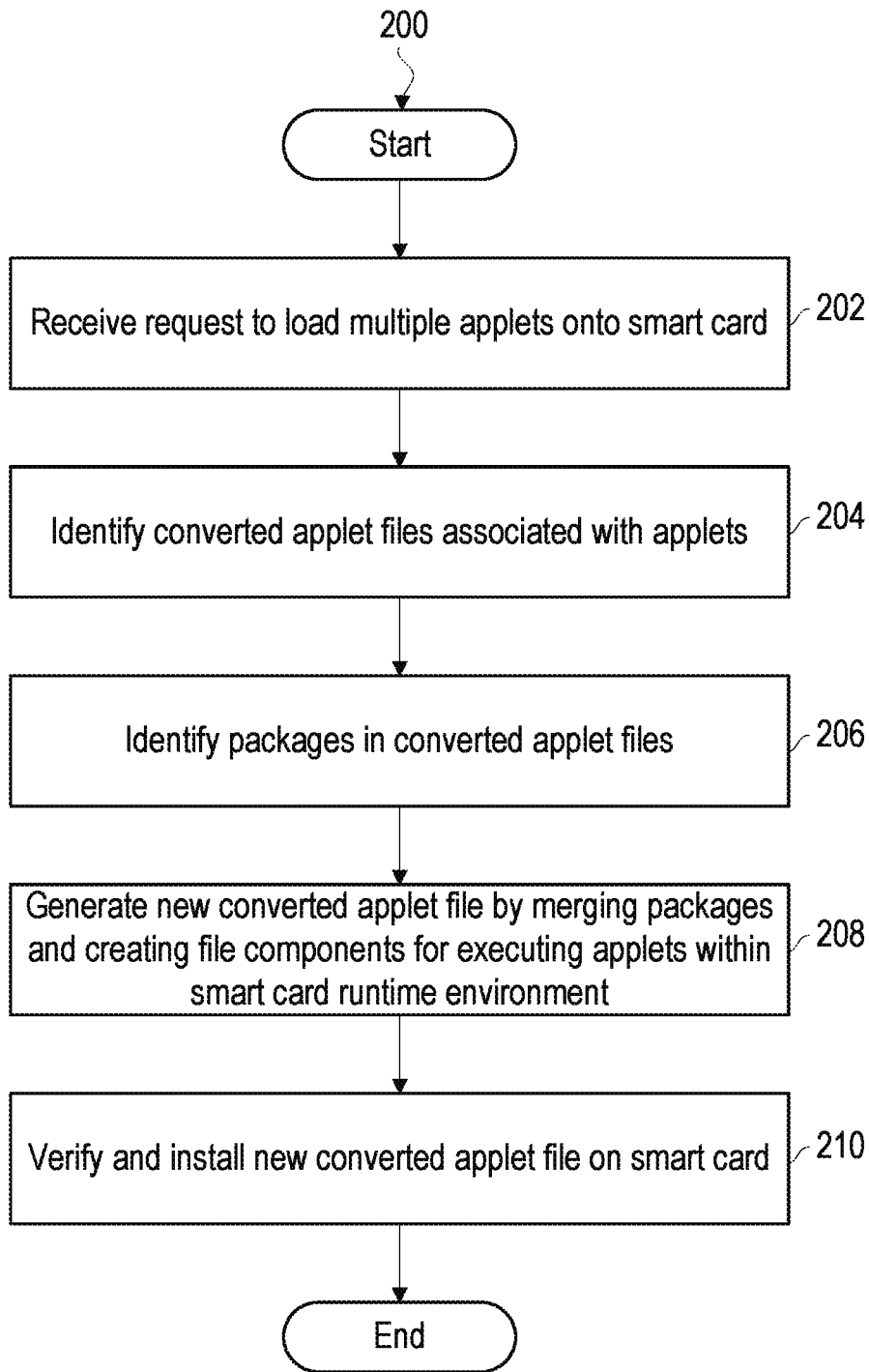
FIG. 2 illustrates an example process for creating and loading an extended smart card application file in accordance with some embodiments.

FIG. 2 illustrates an example process 200 for creating and loading an extended smart card application file in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

At operation 202, process 200 receives a request to load multiple applets onto a smart card. For example, the request may originate from a development environment that allows users to create applets, such as by writing source code in a language of the programmer's preference. In other cases, the user submitting the request may not have access to the source code of one or more of the applets, which may occur if the user is attempting to bundle an applet developed by a third-party with their own applet and/or other third-party applets.

At operation 204, process 200 identifies a set of CAP files associated with the applets. If a CAP file has not yet been generated for one or more of the applets, then process 200 may create a CAP file at this stage. For example, compiler 106 may compile the source code files associated with an applet, and converter 110 may convert the compiled files into a CAP file as previously discussed.

At operation 206, process 200 identifies packages in the CAP files. The set of input CAP files to merge may include extended CAP files that define multiple packages and/or compact CAP files that define a single package. Process 200 may parse the header component of the CAP file to identify which public packages are described therein. Process 200 may add the included packages to a list to track which packages to merge into an extended CAP file. Process 200 may further parse the descriptor components to identify private packages of the input CAP file as private packages are not contained in the header component. Process 200 may add the private packages to the same list as the public packages or maintain separate lists to differentiate between which packages to make public and which packages to make private in the output CAP file.

At operation 208, process 200 generates a new CAP file by merging the identified packages and creating file components for executing the bundled applets within smart card runtime environment 122. For example, process 200 may create a header component, directory component, applet component, class component, method component, constant pool component, static field component, reference location component, import component, export component, and/or descriptor component for the new CAP file. The file components for the extended CAP file may describe the combined set of packages from the input CAP files. Techniques for generating the extended CAP file components are described further below in Section 4, titled Creating Extended Applet File Components from Merged Application Binary Files.

At operation 210, process 200 verifies and installs the new CAP file on a smart card. For example, process 200 may check the new CAP file to ensure the structures therein are internally consistent and adhere to a specification, such as the JCVM Specification. If successfully verified, then, process 200 may write the extended CAP file to memory on the smart card. In some embodiments, the input CAP files used to generate the extended CAP file are not written to the smart card as they are not required to run the bundled applets. In other embodiments, the CAP files may be merged on the smart card itself. In this scenario, the CAP file output by the merge process may replace the input CAP files.

In some embodiments, process 200 may be executed within a development environment for creating, verifying, and installing applets. For example, the development environment may include processes and tools for developing the source code of one or more applets, compiling the source code into class files, and/or converting the class files into CAP files for deployment within a smart card runtime environment.

Additionally or alternatively, the development environment may allow users to select applet files to bundle even if the original source code and class files for the applet are not available. For example, a user may select application binaries, such as CAP files, for each applet that the user wishes to bundle through graphical user interface (GUI). In response, process 200 may be executed to merge the selected application binary files. In other embodiments, the request may originate from other sources, such as through a cloud service or web interface.

In some embodiments, process 200 may be executed to optimize applets that were previously deployed on a smart card. For example, different CAP files may have been installed on a smart card for a set of applications. Process 200 may merge and overwrite the CAP files with the single, extended CAP file to reduce the storage overhead of the application code and boost processing speeds.

Figure 3:
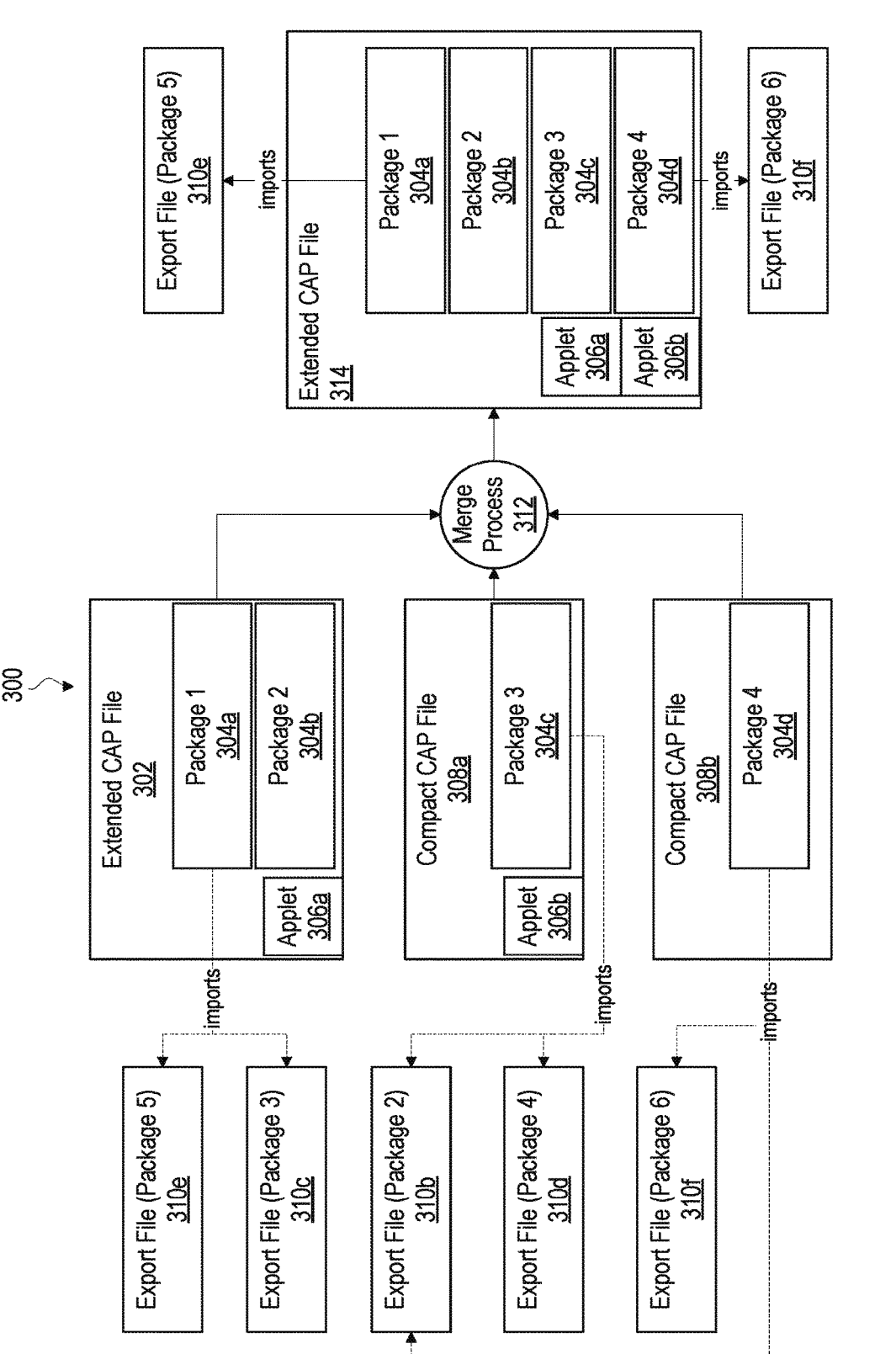
FIG. 3 illustrates an example conversion of multiple applet files to a single, consolidated applet file in accordance with some embodiments.

FIG. 3 illustrates an example conversion of multiple applet files to a single, consolidated applet file in accordance with some embodiments. As illustrated in dataflow diagram 300, merge process 312 receives extended CAP file 302 and compact CAP files 308*a-b* as input. Based on these input CAP files, merge process 312 outputs extended CAP file 314.

Extended CAP file 302 includes multiple packages, which comprise a collection of classes for running applet 306*a*. Compact CAP files 308*a* and 308*b* each include a single package (package 304*c* and 304*d*, respectively). Package 304*c* represents a collection of classes for running applet 306*b*. Compact CAP file 308*b* is not defined specifically for an applet but may correspond to a library or collection of classes that may be imported by other packages used to run one or more other applets.

Export files 310*b-f* include public APIs for linking information of classes in the exported packages. For example, export file 310*b* includes a public API for linking information from package 304*b*, export file 310*c* for package 304*c*, and export file 310*d* for package 304*d*. Package 304*a* is private and does not include an export file or public API, which prevents other packages from accessing its classes.

Export files 310*e* and 310*f* represent external packages that are not internally described in the CAP files but are imported by packages therein. For example, the package exported by export file 310*e* is imported by package 304*a*, and the package exported by export file 310*f* is imported by package 304*d*. The packages within a CAP file may also import packages that are internal to other input CAP files as illustrated.

Merge process 312 generates extended CAP file 314 based on the packages that are internal to each input CAP file, the packages that are imported, and the corresponding export files. In some embodiments, merge process 312 performs a union of the packages defined internally by each input CAP file. Thus, extended CAP file 314 includes a set of components that describe/define packages 304*a-d*. The export files and references importing these packages may be removed since the extended CAP file 314 includes each of the packages.

Merge process 312 further identifies imported packages that are not included in any of the input CAP files. The export files for these packages and import references may be maintained for verification. Export files 112 contain the public API linking information of classes in a package. In some embodiments, export files 112 are not used directly on a device that implements a virtual machine running applets 102*a-n*. However, the information may be used by converter 110 to generate a CAP file. For example, converter 110 may generate an export file when a first package is converted to the CAP file format. If a second, external package imports classes from the first package, then converter 110 may use the export file to convert the second package. During the conversion process, converter 110 may load the export file of the imported package and include information in the CAP file that may be used by the smart card runtime environment to link the contents of the package to items imported from the package.

4. Creating Extended Applet File Components from Merged Application Binary Files The input CAP files and the output CAP file may include a set of file components stored in a binary format that is executable by smartcard runtime environment 122. For example, the file may store virtual machine instructions, such as bytecode, that may be processed directly by virtual machine 130 to run smart card applets. When generating the output extended CAP file, merge process 312 may generate a set of file components based on the input CAP file components and information from the input export files. In some embodiments, merge process 312 assembles the following set of output file components:

A header component generated from a unification of the input CAP files' header components with indexes assigned to each public package;

A directory component generated at the end of the merge process after the other component sizes are known;

An applet component generated with application identifiers (AIDs) from the input CAP files' applet components after the output method component is finalized so that the new install method offsets are known;

A constant pool component generated by merging the input CAP files' constant pool components, removing duplicates, if any, and reordering the merged constant pool to optimize applet runtime performance;

A class component generated by parsing the classes from the input CAP files' class components, reordering the classes according to a specification (e.g., the JCVM Specification);

A method component generated by parsing the methods from the input CAP file method components, de-optimizing and/or reoptimizing bytecode instructions as described further herein, changing constant pool indexes based on the new constant pool, adding methods one by one in the new method component to create the new blocks and offsets, and changing internal method references in the new constant pool based on the new method component;

A static field component generated automatically at the time of adding the classes one by one in the new class component;

A reference location component generated automatically at the time of adding the methods one by one in the new method component;

An import component generated by taking the imported packages from the input import components, removing duplicates and internal bundle components, creating new indexes, changing tokens for external references in the output constant pool component with the new indexes, and changing external references to internal references when applicable;

An export component generated automatically at the time of adding the classes one by one in the new class component for public packages; and A descriptor component generated automatically at the time of adding the classes one by one in the new class component and using information from the old descriptor components.

In some embodiments, the header component does not contain private packages. The descriptor component may include the private packages in terms of indexes in the output CAP file.

FIG. 4 illustrates an example process for generating a set of components for an extended converted applet file based on multiple input converted applet files in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

At operation 402, process 400 identifies packages from the input CAP files. For example, process 400 may parse the header components and/or other components the input CAP files to identify package names, file indexes, references, and/or other identifying information about packages included in the CAP file. For compact CAP files, process 400 may identify a single package per file. For extended CAP files, process 400 may identify multiple packages included per file.

At operation 404, process 400 performs a union of the identified packages. Process 400 may assign an index to the packages for the new file based on the public or private settings for the packages. In some embodiments, process 400 orders private packages after public packages. Thus, private packages may have a higher index than public packages. However, the order may vary depending on the particular implementation.

At operation 406, process 400 generates an array of classes included in the identified packages. In some embodiments, process 400 generate the array by parsing the descriptor component for each package in the input CAP files. Process 400 may add information about the classes, include fields and methods, to the array for each class and associate the class with its package index. Process 400 may sort the array according to the JCVM Specification such that super interfaces in a package are first followed by interfaces, then super classes, and classes. However, the order may vary depending on the particular implementation.

At operation 408, process 400 generates a new extended class component, method component, and static field component based on the array of classes. In some embodiments, process 400 generates these extended components by adding each class from the array along with performing the following operations for each class:

Identify the new class offset and create a mapping between the new offset and the old class offset, class token, and package AID;

For each method added from the class, identify the new method offset and create a mapping between the new offset, class token, method token, and package AID; and For each static field added from the class, identify the new field offset and create a mapping between the new offset, class token, field token, and package AID.

At operation 410, process 400 generates a constant pool component for the output CAP file based on the constant pool components of the input CAP files. Process 400 may unify the constant pool components by merging the input CAP files' constant pool components, removing duplicates, if any, and reordering the merged constant pool to optimize applet runtime performance. Techniques for generating the constant pool component are described in further detail below.

At operation 412, process 400 updates the indexes in the extended method component. The indexes may be updated based on the mappings generated at operation 408. Techniques for updating the method component indexes are described further below in Section 5, titled Method Component Deoptimizations.

At operation 414, process 400 performs a union of the import components. During this operation, process 400 may remove any duplicates, if any. For example, if two or more different input CAP files import the same package, then process 400 may retain one of the import components and delete the other duplicate components. Additionally or alternatively, process 400 may remove internal packages to the bundle. This scenario may occur where a first input CAP file imports a package included in a second input CAP file. In this case, the imported package is external to the first input CAP file but becomes internal during the merge process of the first and second input files. Process 400 may remove these packages and map the AIDs for the remaining packages to an index in the new import component array.

At operation 416, process 400 updates the external constant pool entries to reference the new indexes of the import components. In some embodiments, process 400 changes the external package AID to the new index in the import component. Constant pool entries to references that were external to the input CAP that are now internal to the new, extended CAP file may also be updated to modify the external reference to an internal one.

Figure 5:
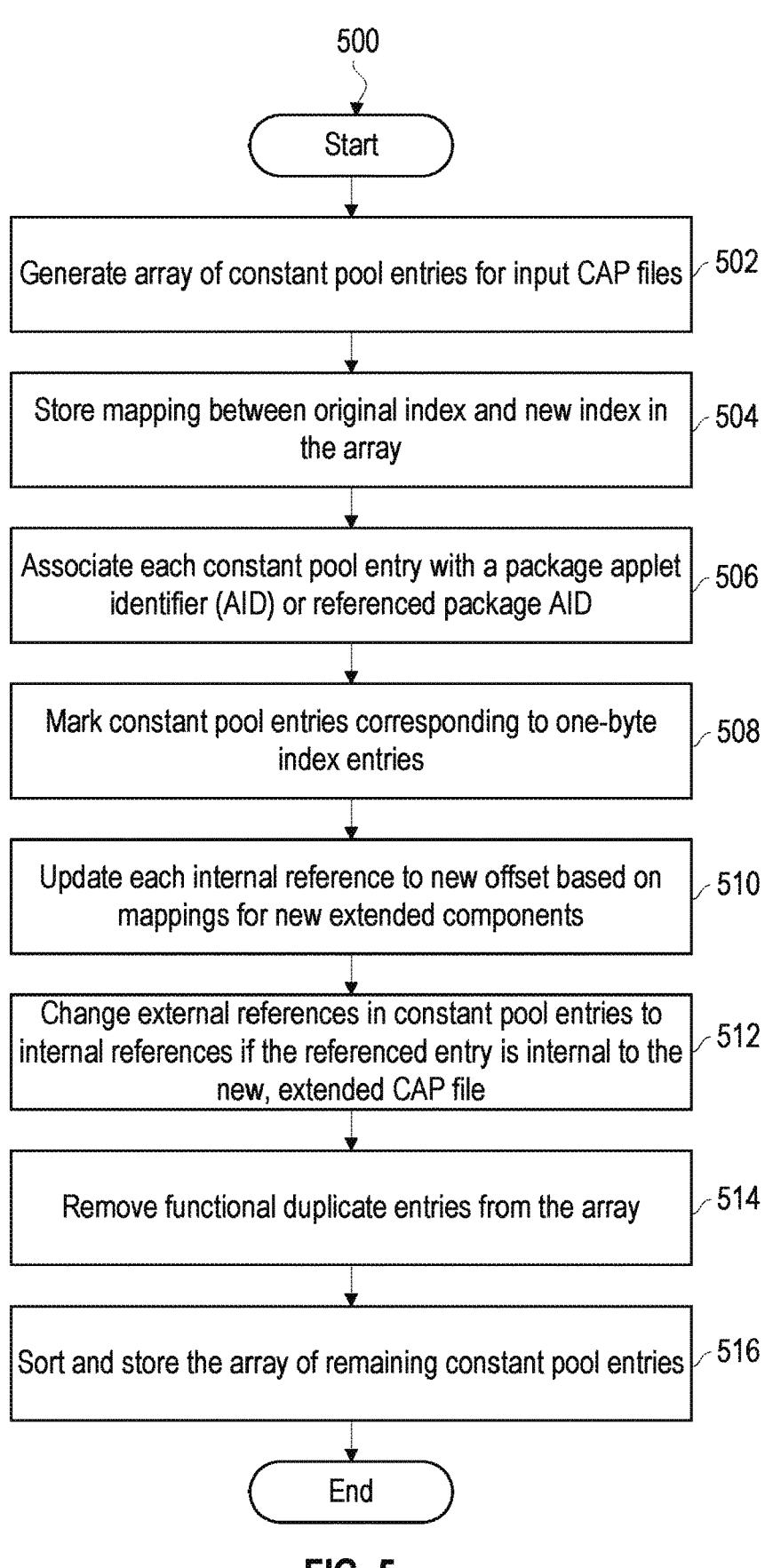
FIG. 5 illustrates an example process for generating a constant pool component for a consolidated applet file in accordance with some embodiments.

FIG. 5 illustrates an example process for generating a constant pool component for a consolidated applet file in accordance with some embodiments. One or more operations illustrated in FIG. 5 may be modified, rearranged, or omitted all together. Accordingly, the particular sequence of operations illustrated in FIG. 5 should not be construed as limiting the scope of one or more embodiments.

At operation 502, process 500 generates an array of constant pool entries for the input CAP files. As previously noted, an entry in the constant pool may represent classes, methods, fields, and/or method data. Constant pool entries may be referred to by one or more virtual machine instructions.

At operation 504, process 500 stores a mapping between the original index and the new index in the array. The original index in this context refers to the index of the constant pool entry in the input CAP file originally containing the entry. The new index corresponds to the location of the entry within the array, which may include constant pool entries extracted from multiple input CAP files.

At operation 506, process 500 associates each constant pool entry with a package AID or referenced package AID. A package AID is a construct used by the virtual machine to identify packages that are internal to the bundle. A referenced package AID may be used by the virtual machine to identify packages that are external to the bundle.

At operation 508, process 500 marks constant pool entries corresponding to one-byte index entries. In the context of JVM bytecode, for example, one-byte index entries may be used in getfield_* and setfield_* optimized instructions. As the name implies, one-byte index entries may be references using a single byte. These entries reduce the storage and processing overhead of the optimized instructions compared to instructions with multiple-byte index entries. However, multiple bytes may be required to reference constant pool entries stored at an index above a threshold (e.g., higher than 256). The constant pool entries of the input CAP files may be optimized by using one-byte indexes for entries that are most frequently referenced by the virtual machine instructions. Process 500 may mark these constant pool entries to maintain the optimizations to the extent possible.

At operation 510, process 500 updates each internal reference to the new offset based on the mappings for the new extended components. In some embodiments, process 500 identifies each internal class reference, internal static method reference, and internal static field reference within the array of constant pool entries. Process 500 may change the references using the new offset according to the mappings performed at operation 408.

At operation 512, process 500 changes external references in the constant pool entries to corresponding internal references if the referenced entity is internal to the new, extended CAP file. In some embodiments, process 500 identifies each external class reference, including the one contained in the virtual method references and instance field references, external static method reference, and external static field reference. Process 500 next checks if the entry is internal to the bundle according to the associated package AID. If the package is internal, the entry is changed to an internal one, and process 500 updates the new offset according to the mapping performed at operation 408.

At operation 514, process 500 removes duplicate entries from the array. For example, process 500 may remove duplicate internal class references, static method references, and/or static field references included in the array. Process 500 may then update the index for entries for which the index changed after the removal.

At operation 516, process 500 sorts and stores the array of remaining constant pool entries. In some embodiments, process 500 sorts the constant pool array so that the one-byte index entries marked at operation 508 are at the beginning of the array. Process 500 may then update the index for entries for which the index changed after sorting the array.

5. Method Component Deoptimizations

Figure 6:
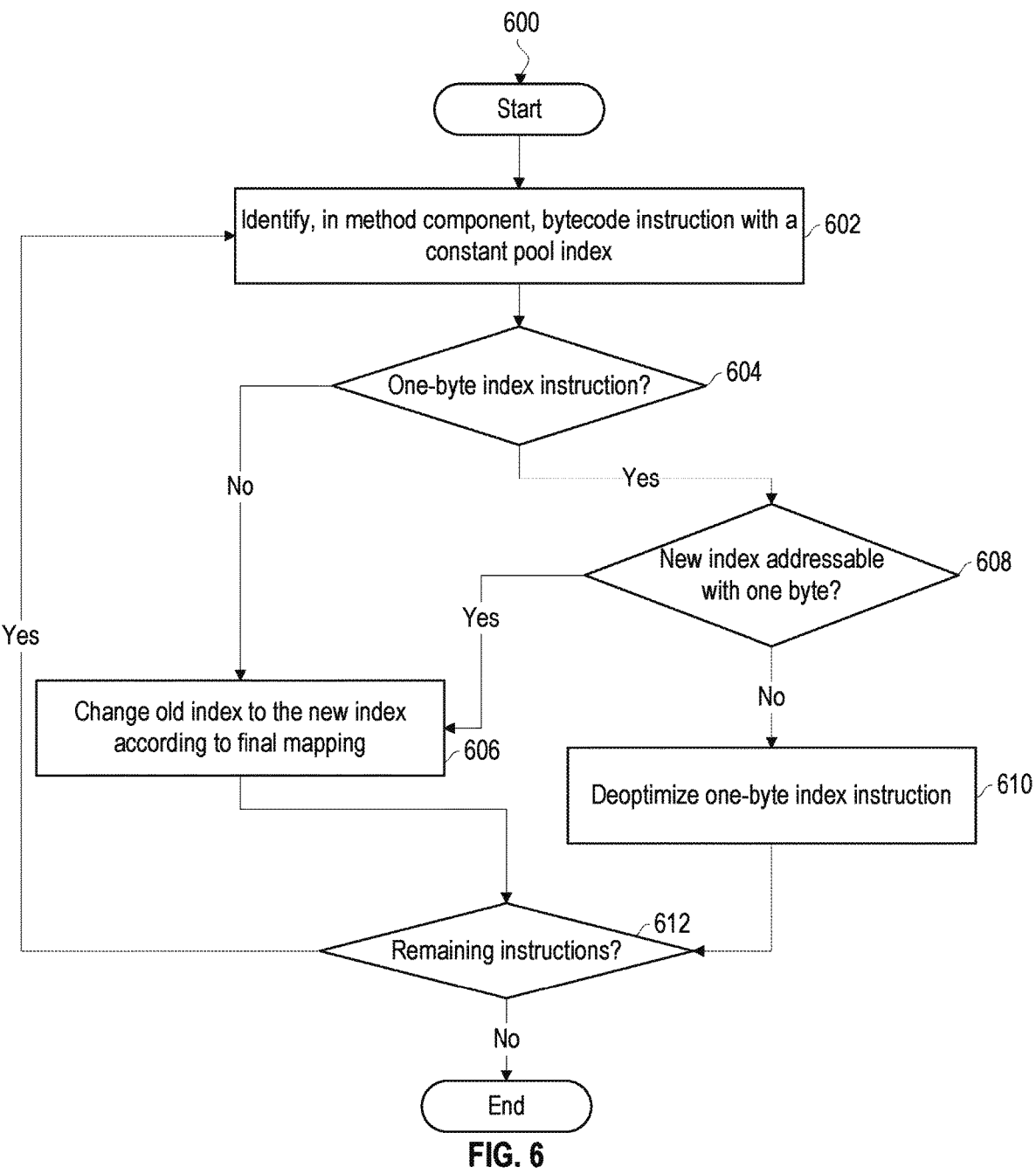
FIG. 6 illustrates an example process for updating a method component of a consolidated applet file in accordance with some embodiments.

When merging the constant pool entries from multiple input CAP files, entries with one-byte indexes in the input CAP file may be assigned an index that requires multiple bytes to reference. To accommodate these changes, virtual machine instructions that are optimized to use one-byte indexes may be deoptimized. For example, FIG. 6 illustrates an example process for updating a method component of a consolidated applet file in accordance with some embodiments. One or more operations illustrated in FIG. 6 may be modified, rearranged, or omitted all together. Accordingly, the particular sequence of operations illustrated in FIG. 6 should not be construed as limiting the scope of one or more embodiments.

At operation 602, process 600 identifies, in the extended method component, a bytecode instruction with a constant pool index. In the context of JVM bytecode, for instance, instructions such as getfield and setfield include constant pool indexes. However, the instructions may vary depending on the particular virtual machine specification and format of the instructions.

At operation 604, process 600 determines whether the instruction is a one-byte index instruction. As previously noted, getfield_* and setfield_* instructions may include one-byte indexes. If the instructions do not match these optimized instructions, then process 600 may deduce that the instruction uses a multiple-byte index. However, the set of instructions that use one-byte indexes may vary depending on the particular implementation.

At operation 606, if the instruction is not a one-byte index (e.g., not a getfield_* and setfield_* optimized instruction), then process 600 changes the old index to the new index according to the final mapping generated at operation 516. Thus, the instruction is updated, maintaining a multiple-byte index to the entry at its final location in the extended constant pool component.

At operation 608, if the instruction is a one-byte index, then the process determines whether the new index for the entry in the extended constant pool is addressable with one byte. If so, then the process changes the old index to the new index according to the final mapping generated at operation 516. Thus, the optimized instruction is maintained with a changed one-byte index to the final location in the extended constant pool component.

At operation 610, if the new index is not addressable with one byte, then process 600 deoptimizes the one-byte index instruction. For example, process 600 may de-optimize a JVM instruction by doing the following:

If the instruction is a getfield_<t> instruction, change it to getfield_<t>_w and update the index based on the final mapping generated at operation 516;

If the instruction is a putfield_<t> instruction, change it to putfield_<t>_w and update the index based on the final mapping;

If the instruction is a getfield_<t>_this, add an additional aload_0 instruction before it, change it to getfield_<t>_w, update the index per the final mapping and then increment the address instructions (e.g., branch instructions) with an address higher than the inserted instruction by one;

If the instruction is a putfield_<t>_this, add an additional aload_0 instruction, one instruction before it, change it to putfield_<t>_w, update the index per the final mapping and then increment the address instructions (e.g., branch instructions) with an address higher than the inserted instruction by one.

At operation 612, process 600 determines whether there are any remaining instructions to analyze within the extended method component for the new CAP file. If so, then the process may iterate until all bytecode instructions with constant pool indexes have been updated.

Figure 7:
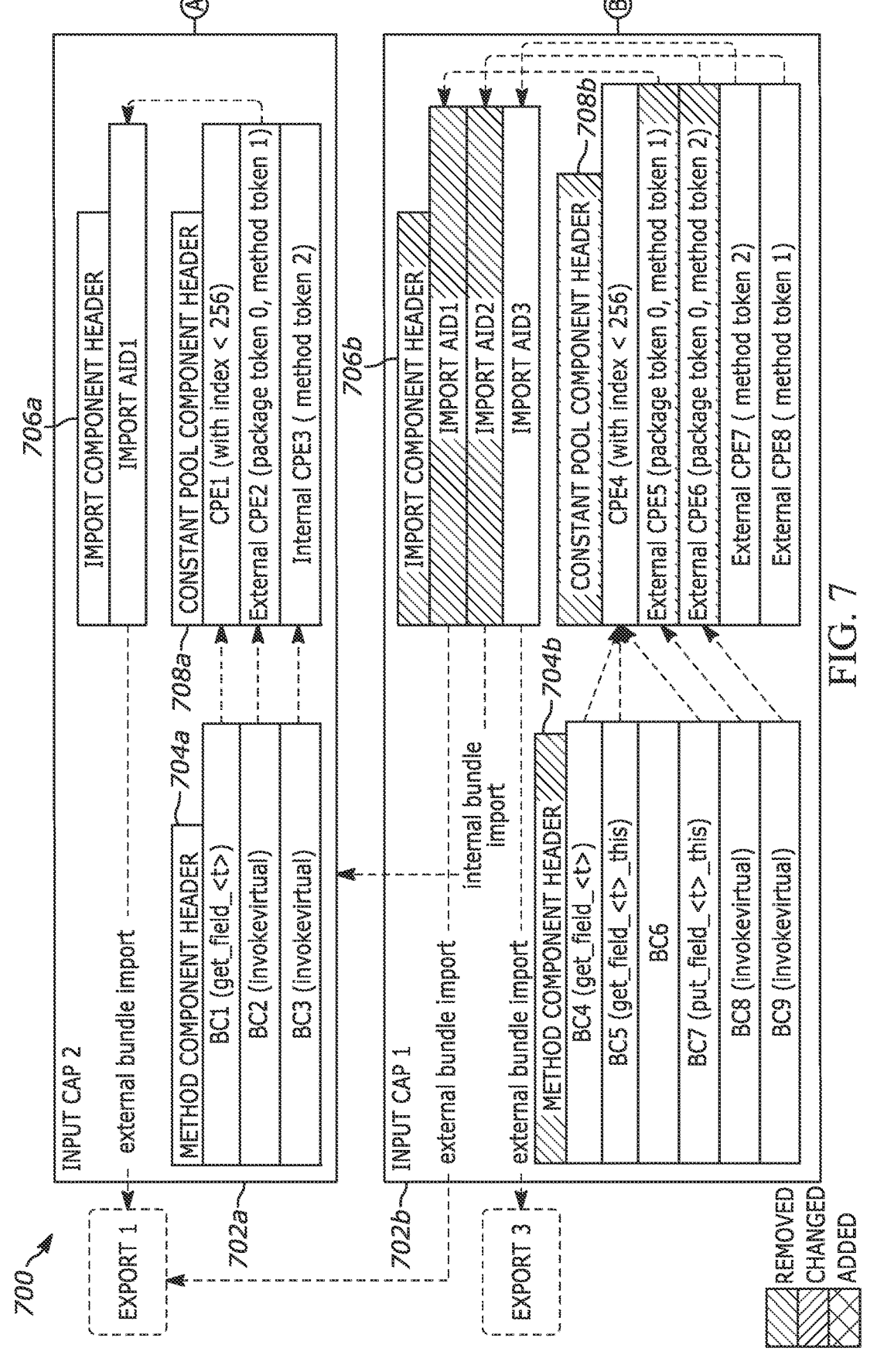
FIG. 7 illustrates an example set of components generated from merged input applet files in accordance with some embodiment.
Figure 7:
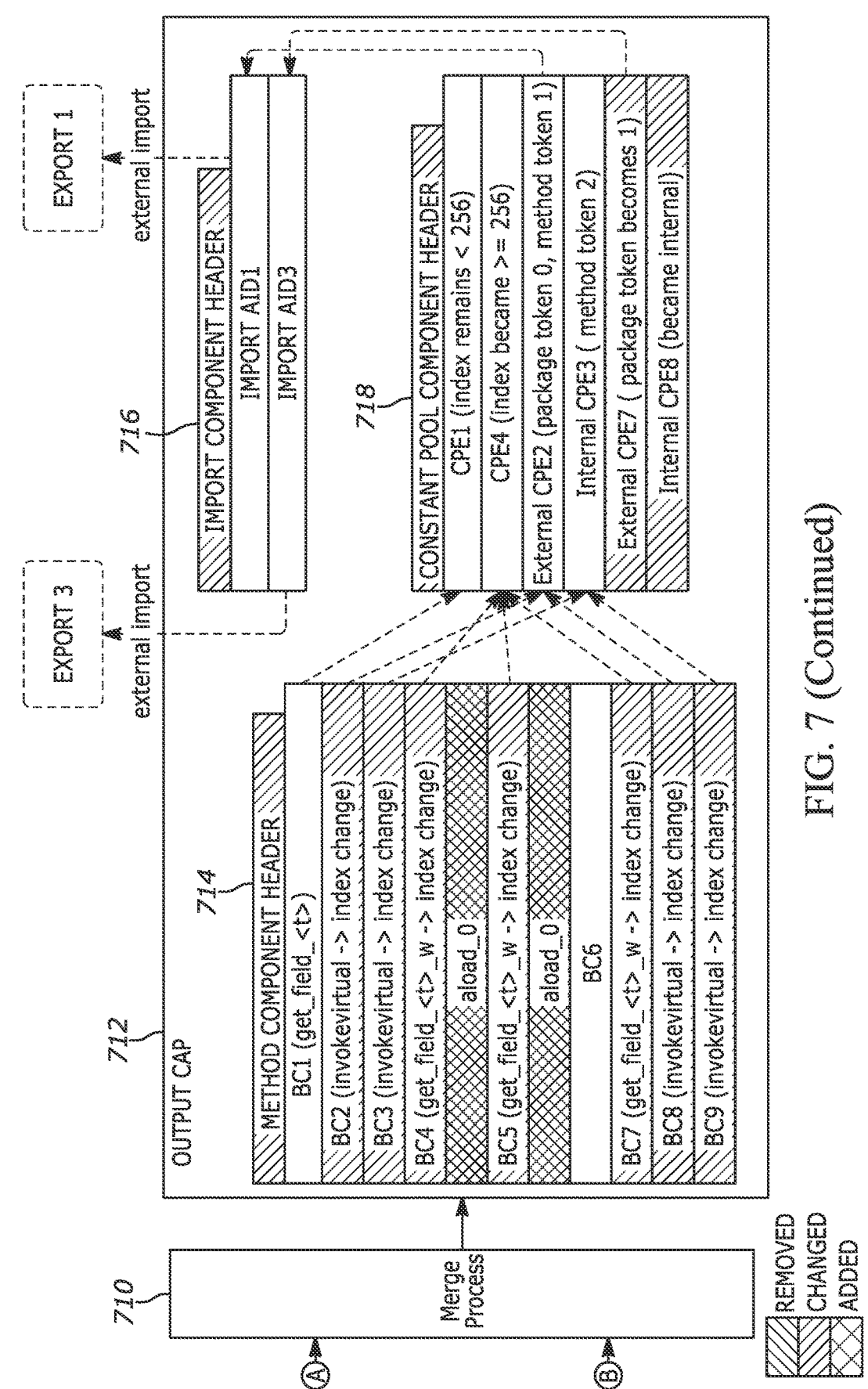

FIG. 7 illustrates an example set of components generated from merged input applet files in accordance with some embodiment. As illustrated in dataflow diagram 700, merge process 710 receives input CAP file 702a and input CAP file 702b. Input CAP file 702a includes method component header 704a, import component 706a, and constant pool component 708a. Similarly, Input CAP file 702b includes method component header 704b, import component 706b, and constant pool component 708b.

As shown, merge process 710 removes duplicate entries from import component 706b and constant pool component 708b that are duplicates or for entries that become internal in the merged file. Merge process 710 further removes the headers for method component 704b, import component 706b, and constant pool component 708b, retaining only a single header for output CAP file 712. The retained headers are updated in output CAP file 712 to reflect the combined packages merged from the two files.

Output CAP file 712 includes extended method component 714, extended import component 716, and extended constant pool component 718. Merge process 710 may generate extended constant pool component 718 by executing the set of operations illustrated in FIG. 5. Merge process 710 may update method component 714 by executing the set of operations illustrated in FIG. 6. In particular, the instructions may be updated to point to the new index locations of the constant pool entries within constant pool component 718. Method component 714 further includes added aload_0 instructions from deoptimizing instructions for entries that changed from one-byte indexes to multiple-byte indexes. Thus, merge process 710 may add instructions that were not previously present in the input CAP files to deoptimize a bytecode instruction.

In some embodiments, merge process 710 determines which entries to move from one-byte indexes to multiple-byte indexes based on how many times the entry is referenced by bytecode instructions in the method component. For example, merge process 710 may sort the entries based on how frequently the entry is referenced. Thus, the most frequently referenced entries may maintain the one-byte index while less-frequently referenced entries may be moved to multiple-byte indexes. For entries that have been updated to a multiple-byte index, merge process 710 may deoptimize instructions that reference the entry as previously described.

6. Flexible Access Controls

In some embodiments, the merge process may make packages public or private within the extended CAP file. A public package inside a CAP file may be associated with an AID and version that uniquely identifies the package and allows other CAP files to import the package. A private package may have no AID and version, or this information may be hidden and inaccessible. Private packages may correspond to packages with no export information that may not be imported by other CAP files.

In some embodiments, the merge process may change packages that are public in the input CAP files to private packages in the output CAP file. Referring to FIG. 3, for example, package 304b, 304c, and 304d are public packages that are associated with export files imported by other input CAP files. Merge process 312 may change these packages to private, removing the export files and the associated public APIs, thereby preventing access to these packages from other CAP files within the runtime environment.

In some embodiments, the merge process may make the change from public to private by default. Additionally or alternatively, the entity requesting the bundle may specify which packages to change, allowing flexibility in the access controls. For example, an entity may wish to bundle a third-party applet with an applet developed in house. The entity may not inherently trust the third-party or have access to the source code files for the applet. When bundling the applets, the entity may request that the third-party applet packages be made private to cut off access to the applet from external sources. In response, binary files may be merged, as previously described, with the merge process modifying any public packages in the third-party input CAP files to private. Packages that are part of the bundle and included in the same CAP file may internally access the third-party packages. However, the virtual machine prevents external CAP files from accessing packages that are private in the bundle.

Changing a package from public to private may affect the index of the package within the updated CAP file. As previously noted, the private packages have a higher index than public packages according to the JCVM Specification. The package index may be assigned or updated such that it comes after any public packages in the CAP file. Additionally or alternatively, the merge process may generate or update file component headers and/or other data to reflect the private nature and associated access controls on the package. For example, the header component may be generated to include public package indexes and the descriptor component may be generated to include the private package indexes.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
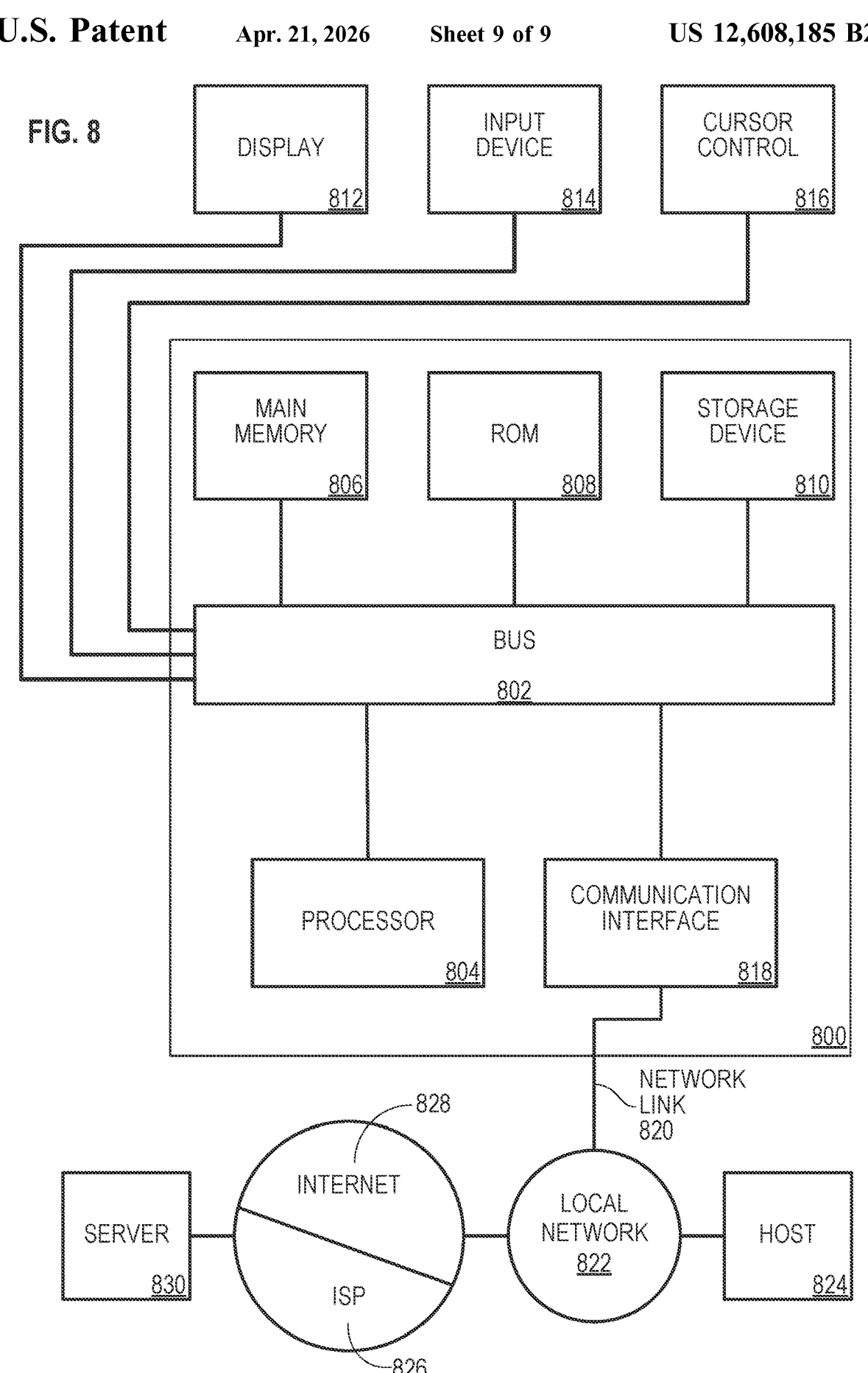
FIG. 8 illustrates a computer system upon which some embodiments may be implemented.

For example, FIG. 8 illustrates computer system 800 upon which some embodiments may be implemented. Computer system 800 includes bus 802 and/or one or more other communication mechanisms for transferring data between system components. Computer system 800 also includes hardware processor 804 coupled with bus 802 for processing information. Hardware processor 804 may be, for example, a general-purpose microprocessor.

Computer system 800 further includes main memory 806, such as random-access memory (RAM) and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 and/or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light-emitting diode (LED) screen, for displaying information to a computer user. Input device 814, including alphanumeric and other keys, is coupled to bus 802 for communicating information and command selections to processor 804. Another type of user input device is cursor control 816, such as a touchscreen, mouse, a trackball, or cursor direction keys for communicating direction information and command selections to processor 804 and for controlling cursor movement on display 812. This input device may have two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes communication interface 818 coupled to bus 802. Communication interface 818 provides a two-way data communication coupling to network link 820 that is connected to local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to host computer 824 or to data equipment operated by Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:

accessing, by an application that bundles smart card applications, a plurality of application files that are executable by a smart card runtime environment to run a plurality of smart card applications; and generating, within volatile or non-volatile storage of a computing device based at least in part on the plurality of application files for running the plurality of smart card applications, a single application file that is executable by the smart card runtime environment to run the plurality of smart card applications within the smart card runtime environment, wherein generating the single application file includes (a) merging, by the application that bundles smart card applications, at least a first package including executable code from a first application file for executing a first smart card application on a smart card with a second package including executable code from a second application file for executing a second smart card application on the smart card and (b) modifying, by the application that bundles smart card applications, the first package including executable code that is public in the plurality of application files to private in the single application file, wherein modifying the first package including executable code to private includes removing an export file and each application programming interface (API) for accessing classes associated with the first smart card application within the first package, wherein the single application file has a smaller storage size than the plurality of application files; and installing the single application file having the smaller storage size within memory of the smart card, wherein the smart card runs the plurality of smart card applications, including the first smart card application and the second smart card application, by executing, using a secure element processor, the single application file, wherein when executing the single application file, the smart card prevents one or more packages associated with the second smart card application from accessing classes associated with the first smart card application within the first package made private.

2. The one or more non-transitory machine-readable media as recited in claim 1, wherein the single application file is executable by a virtual machine running within the smart card runtime environment.

3. The one or more non-transitory machine-readable media as recited in claim 1, wherein the plurality of application files include at least a first binary file for running a first application and a second binary file for running a second application; wherein the single application file is generated based at least in part by merging a set of components in the first binary file and the second binary file.

4. The one or more non-transitory machine-readable media as recited in claim 1, wherein the plurality of application files include converted applet files; wherein each converted applet file describes one or more packages of related classes for performing one or more applet-specific functions when executed within a smart card runtime environment.

5. The one or more non-transitory machine-readable media as recited in claim 1, wherein the instructions further cause: modifying at least one external reference identified based on the plurality of application files to an internal reference within the single application file.

6. The one or more non-transitory machine-readable media as recited in claim 1, wherein the instructions further cause: deoptimizing at least one bytecode instruction within the single application file based on a change in index to a resource referenced by the bytecode instruction.

7. The one or more non-transitory machine-readable media as recited in claim 6, wherein deoptimizing the at least one bytecode instruction comprises adding at least one additional instruction that was not previously present in the plurality of application files.

8. The one or more non-transitory computer-readable media as recited in claim 1, wherein the instructions further cause: merging a set of component headers for a particular component in the plurality of application files into a single header for the particular component in the single application file.

9. A method comprising:

accessing, by an application that bundles smart card applications, a plurality of application files that are executable by a smart card runtime environment to run a plurality of smart card applications; and generating, within volatile or non-volatile storage of a computing device based at least in part on the plurality of application files for running the plurality of smart card applications, a single application file that is executable by the smart card runtime environment to run the plurality of smart card applications within the smart card runtime environment, wherein generating the single application file includes (a) merging, by the application that bundles smart card applications, at least a first package including executable code from a first application file for executing a first smart card application on a smart card with a second package including executable code from a second application file for executing a second smart card application on the smart card and (b) modifying, by the application that bundles smart card applications, the first package including executable code that is public in the plurality of application files to private in the single application file, wherein modifying the first package including executable code to private includes removing an export file and each application programming interfaces (API) for accessing classes associated with the first smart card application within the first package, wherein the single application file has a smaller storage size than the plurality of application files; and installing the single application file having the smaller storage size within memory the smart card, wherein the smart card runs the plurality of smart card applications, including the first smart card application and the second smart card application, by executing, using a secure element processor, the single application file, wherein when executing the single application file, the smart card prevents one or more packages associated with the second smart card application from accessing classes associated with the first smart card application within the first package made private.

10. The method as recited in claim 9, wherein the single application file is executable by a virtual machine running within the smart card runtime environment.

11. The method as recited in claim 9, wherein the plurality of application files include at least a first binary file for running a first application and a second binary file for running a second application; wherein the single application file is generated based at least in part by merging a set of components in the first binary file and the second binary file.

12. The method as recited in claim 9, wherein the plurality of application files include converted applet files; wherein each converted applet file describes one or more packages of related classes for performing one or more applet-specific functions when executed within a smart card runtime environment.

13. The method as recited in claim 9, further comprising: modifying at least one external reference identified based on the plurality of application files to an internal reference within the single application file.

14. The method as recited in claim 9, further comprising: deoptimizing at least one bytecode instruction within the single application file based on a change in index to a resource referenced by the bytecode instruction.

15. The method as recited in claim 14, wherein deoptimizing the at least one bytecode instruction comprises adding at least one additional instruction that was not previously present in the plurality of application files.

16. The method as recited in claim 9, further comprising: merging a set of component headers for a particular component in the plurality of application files into a single header for the particular component in the single application file.

17. A system comprising:

one or more hardware processors;

one or more non-transitory computer-readable media storing instructions, which, when executed by the one or more hardware processors, cause the system to perform operations comprising:

accessing, by an application that bundles smart card applications, a plurality of application files that are executable by a smart card runtime environment to run a plurality of smart card applications; and generating, within volatile or non-volatile storage of a computing device based at least in part on the plurality of application files for running the plurality of smart card applications, a single application file that is executable by the smart card runtime environment to run the plurality of smart card applications within the smart card runtime environment, wherein generating the single application file includes (a) merging, by the application that bundles smart card applications, at least a first package including executable code from a first application file for executing a first smart card application on a smart card with a second package including executable code from a second application file for executing a second smart card application on the smart card and (b) modifying, by the application that bundles smart card applications, the first package including executable code that is public in the plurality of application files to private in the single application file, wherein modifying the first package including executable code to private includes removing an export file and each application programming interface (API) for accessing classes associated with the first smart card application within the first package, wherein the single application file has a smaller storage size than the plurality of application files; and installing the single application file having the smaller storage size within memory of the smart card, wherein the smart card runs the plurality of smart card applications, including the first smart card application and the second smart card application, by executing, using a secure element processor, the single application file, wherein when executing the single application file, the smart card prevents one or more packages associated with the second smart card application from accessing classes associated with the first smart card application within the first package made private.

18. The system as recited in claim 17, wherein the single application file is executable by a virtual machine running within the smart card runtime environment.

19. The system as recited in claim 17, wherein the plurality of application files include at least a first binary file for running a first application and a second binary file for running a second application; wherein the single application file is generated based at least in part by merging a set of components in the first binary file and the second binary file.

20. The system as recited in claim 17, wherein the plurality of application files include converted applet files; wherein each converted applet file describes one or more packages of related classes for performing one or more applet-specific functions when executed within a smart card runtime environment.

* * * * *